US010430769B2

(12) United States Patent
Castinado et al.

(10) Patent No.: US 10,430,769 B2
(45) Date of Patent: Oct. 1, 2019

(54) SYSTEM FOR ATYPICAL THIRD PARTY CHANNEL UTILIZATION FOR RESOURCE DISTRIBUTION COMPLETION

(71) Applicant: BANK OF AMERICA CORPORATION, Charlotte, NC (US)

(72) Inventors: Joseph Benjamin Castinado, North Glenn, CO (US); Pavan Kumar Neelam, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 357 days.

(21) Appl. No.: 15/588,294

(22) Filed: May 5, 2017

(65) Prior Publication Data

US 2018/0322473 A1    Nov. 8, 2018

(51) Int. Cl.
| | |
|---|---|
| *G06Q 20/08* | (2012.01) |
| *G06Q 20/36* | (2012.01) |
| *G06Q 20/34* | (2012.01) |
| *G06Q 20/20* | (2012.01) |
| *G06Q 20/32* | (2012.01) |
| *G06Q 20/24* | (2012.01) |
| *H04W 4/02* | (2018.01) |
| *H04W 84/12* | (2009.01) |
| *H04W 4/80* | (2018.01) |

(52) U.S. Cl.
CPC ....... *G06Q 20/0855* (2013.01); *G06Q 20/204* (2013.01); *G06Q 20/24* (2013.01); *G06Q 20/327* (2013.01); *G06Q 20/34* (2013.01); *G06Q 20/36* (2013.01); *H04W 4/02* (2013.01); *H04W 4/80* (2018.02); *H04W 84/12* (2013.01)

(58) Field of Classification Search
CPC .. G06Q 20/0855; G06Q 20/204; G06Q 20/24; G06Q 20/327; G06Q 20/34; G06Q 20/36; H04W 4/02; H04W 4/80; H04W 84/12
See application file for complete search history.

(56) References Cited

U.S. PATENT DOCUMENTS

| | | | |
|---|---|---|---|
| 6,609,113 | B1 | 8/2003 | O'Leary et al. |
| 7,784,684 | B2 | 8/2010 | Labrou et al. |
| 7,873,573 | B2 | 1/2011 | Realini |
| 8,196,131 | B1 | 6/2012 | von Behren et al. |
| 8,352,323 | B2 | 1/2013 | Fisher |
| 8,380,177 | B2 | 2/2013 | Laracey |

(Continued)

*Primary Examiner* — A. Hunter Wilder
*Assistant Examiner* — Joseph M Mutschler
(74) *Attorney, Agent, or Firm* — Michael A. Springs; Moore & Van Allen PLLC; Nicholas C. Russell

(57) ABSTRACT

Embodiments of the invention are directed to a system, method, or computer program product for utilizing and linking into an atypical third party channel for completion of resource distribution. In this way, a third party system may not implement hardware for digital or electronic resource acceptance. The system links into local channels such as wireless networks to send resource distributions to a server to map and authorize resource distribution. Network systems may communicate back directly to the third party for approval of the resource distribution. Furthermore, the system interacts between the network system and third party to initiate and complete authorization for a digital resource distribution that is otherwise not capable of being performed by a third party system.

13 Claims, 6 Drawing Sheets

(56) References Cited

U.S. PATENT DOCUMENTS

| | | | |
|---|---|---|---|
| 8,577,803 B2 | 11/2013 | Chatterjee et al. | |
| 8,635,157 B2* | 1/2014 | Smith | G06Q 20/20 |
| | | | 705/39 |
| 8,756,161 B2 | 6/2014 | Hasson et al. | |
| 8,985,442 B1 | 3/2015 | Zhou et al. | |
| 2002/0004783 A1 | 1/2002 | Paltenghe et al. | |
| 2008/0208762 A1* | 8/2008 | Arthur | G06Q 20/027 |
| | | | 705/79 |
| 2010/0088188 A1 | 4/2010 | Kumar et al. | |
| 2012/0226565 A1* | 9/2012 | Drozd | G06Q 20/20 |
| | | | 705/16 |
| 2013/0159178 A1 | 6/2013 | Colon et al. | |
| 2013/0346305 A1 | 12/2013 | Mendes | |
| 2014/0006129 A1 | 1/2014 | Heath | |
| 2014/0019352 A1* | 1/2014 | Shrivastava | G06Q 20/3674 |
| | | | 705/41 |
| 2014/0129422 A1 | 5/2014 | Zhou et al. | |
| 2014/0138435 A1 | 5/2014 | Khalid | |
| 2014/0207682 A1 | 7/2014 | Wolfond et al. | |

* cited by examiner

SYSTEM FOR ATYPICAL THIRD PARTY CHANNEL UTILIZATION FOR RESOURCE DISTRIBUTION COMPLETION

BACKGROUND

Digital or electronic resource distribution with a third party entity may be possible using embedded technology within a third party entity system. While allowing for resource distribution across entity channels, this embedded technology is necessary for integration. As such, a need exists to provide resource distribution with a third party entity using atypical channels that are more common to third party entities. Distribution

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The current market of digital or electronic resource distribution avenues, including digital wallets and the like typically require implementation of near field communication (NFC) or similar technology embedded within the merchant system and a user device as a means to propagate resource distribution via payment rails. When a resource distribution is displayed on a user facing terminal of a point-of-sale (POS) device at a merchant, the user utilizes a user device to select the desired vehicle for resource distribution and utilizes touch authentication via the NFC device.

Currently, NFC devices do not have large market acceptance. Market research suggests that larger merchants are utilizing these services and implementing this technology. However, for smaller scale merchants it is not easily ascertainable based on cost of replacing the existing POS with NFC capable POS or install a new NFC hardware that interacts with existing POS system at their store.

As such, embodiments of the present invention address the above needs and/or achieve other advantages by creating a system for atypical third party channel utilization for resource distribution completion. In this way, the system links local channels such as mobile internet or Wi-Fi to send resource distributions to a server with centralized NFC logic to map a virtual credit card to a physical credit card account. The account linking between merchant account and user account for resource transfer happens with parameter such as merchant store name, merchant store number, merchant store phone number, merchant zip code, user's phone number, or the like. The system, which includes mobile application logic comprising an translational engine will link all the required details to form a secure resource distribution order that is posted to merchant account via standard payment rails. The system, via mobile application integration may maintain a cache of merchant information based on location and frequency of user's visits. As such, the information will be used to present the ordered merchant list on mobile interface based on geo-location.

Embodiments of the invention relate to systems, methods, and computer program products for atypical third party channel utilization for resource distribution, the invention comprising: identifying a user requesting a digital resource distribution to a merchant, wherein identifying the request comprises integrating within a user device associated with the digital resource distribution request; determining software and hardware incapability within merchant system to complete the digital resource distribution; identifying merchant wireless channel and link communicably to the wireless channel; requesting and receiving resource distribution information from the user device, wherein the resource distribution information includes a digital resource distribution token required for the digital resource distribution to the merchant; translating the digital resource distribution token into a physical resource distribution account number; distributing the translated digital resource distribution token to a resource distribution network system for processing and authorization; matching, within the resource distribution network, the distributed translated digital resource distribution token with resource distribution processing transmitted from the merchant system to the resource distribution network; and transmitting resource distribution network resource distribution approval to user device.

In some embodiments, the invention further comprises communicating to the merchant system to allow the merchant system to distribute the resource distribution processing about the digital resource distribution to the resource distribution network without receiving a credit card from the user.

In some embodiments, the digital resource distribution further comprises a digital wallet, wherein a digital resource distribution token includes a virtual credit card token that is stored in a user device memory for digital resource distribution to the merchant.

In some embodiments, the invention further comprises allowing the resource distribution network to transmit an approval of the resource distribution to the merchant system based on an approval of the resource distribution by the resource distribution network.

In some embodiments, the merchant wireless channel further comprises a wireless network associated with a merchant place of business. In some embodiments, the merchant system is a POS device and the merchant system does not have NFC or digital wallet transaction software and hardware.

In some embodiments, resource distribution information further comprises transaction information to complete a transaction with a merchant including user name, user digital resource distribution account, merchant name, merchant contact information, product/service information, and a resource distribution requirement to complete a transaction. In some embodiments, the resource distribution processing further comprises a transaction total for the resource distribution.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
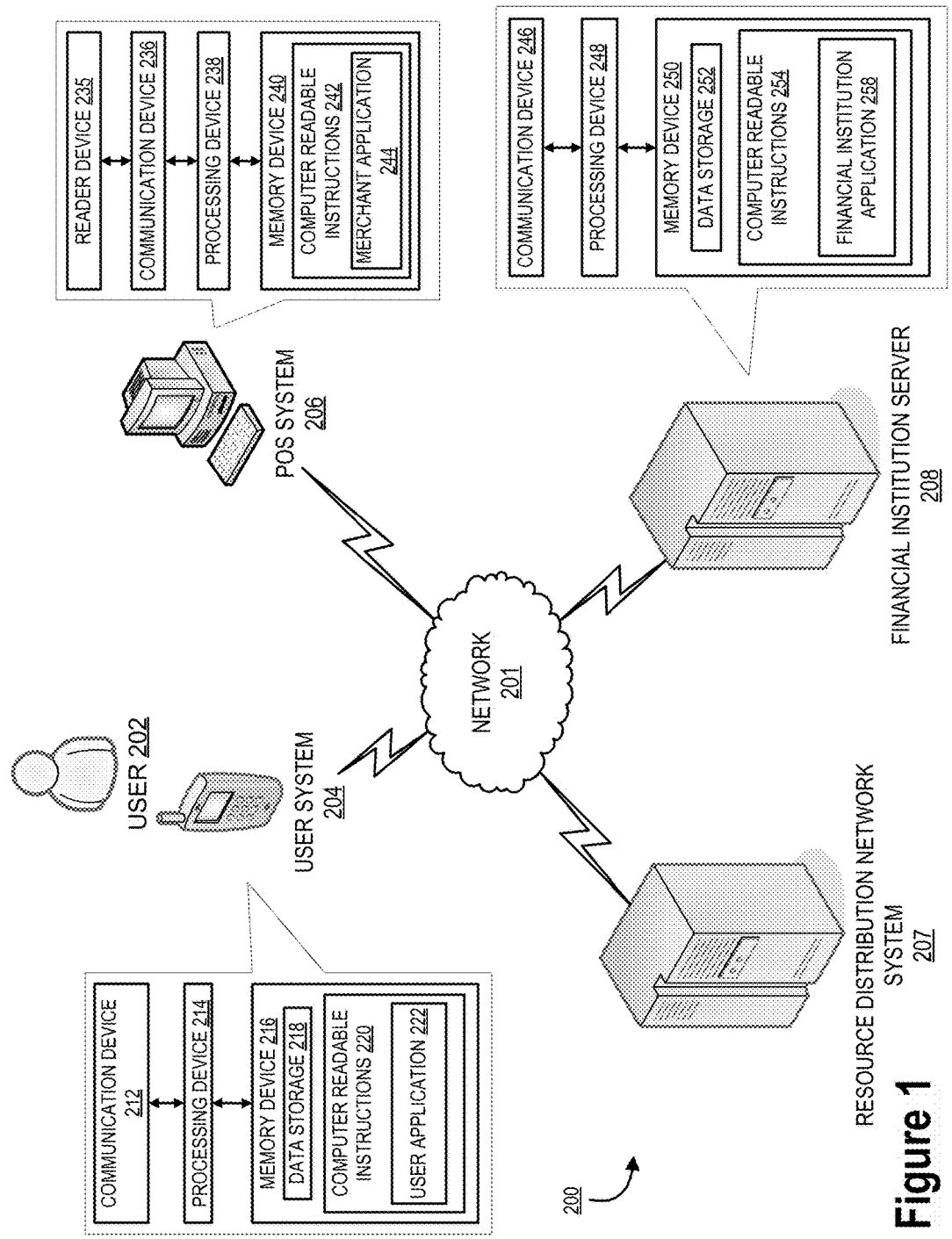
Figure 2:
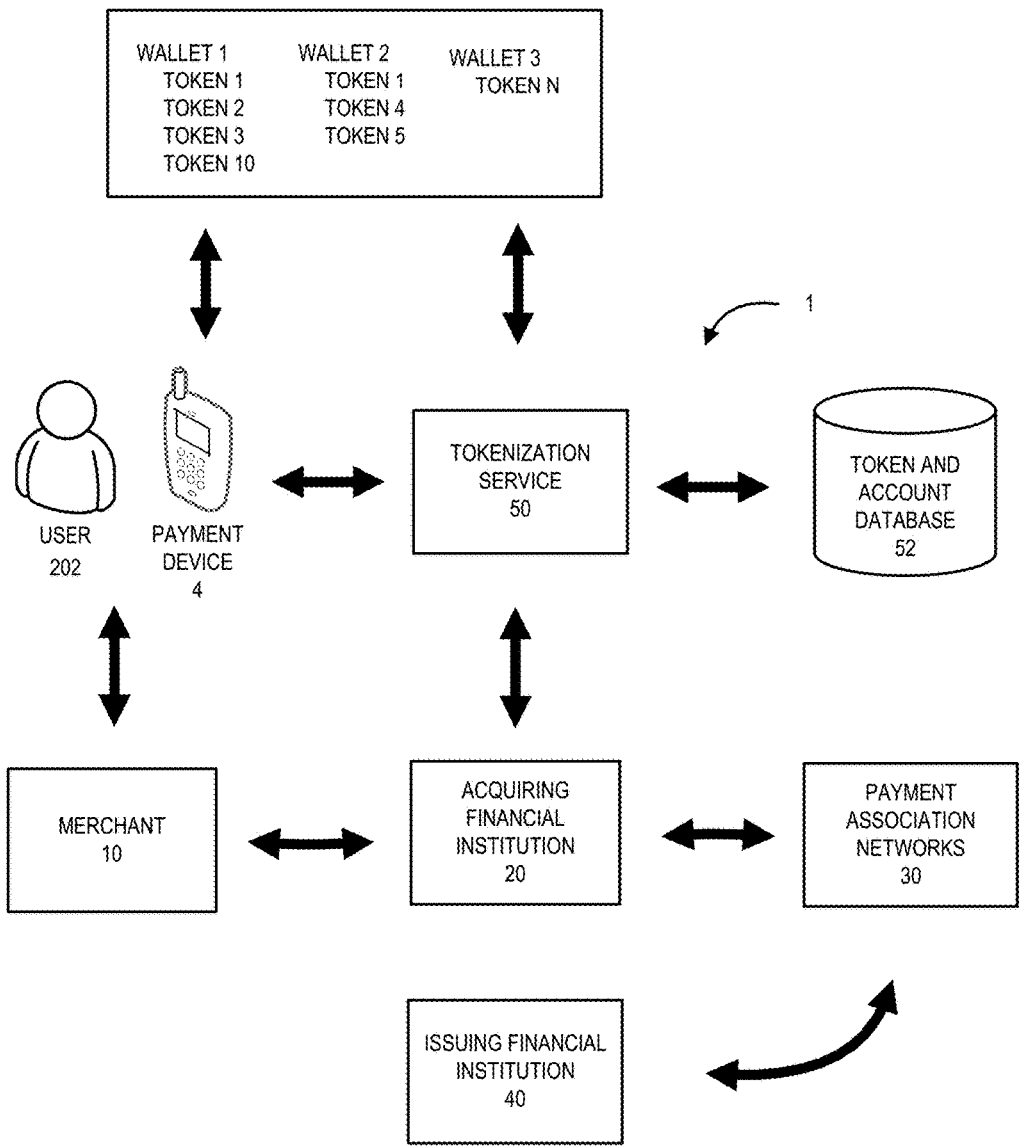
Figure 3:
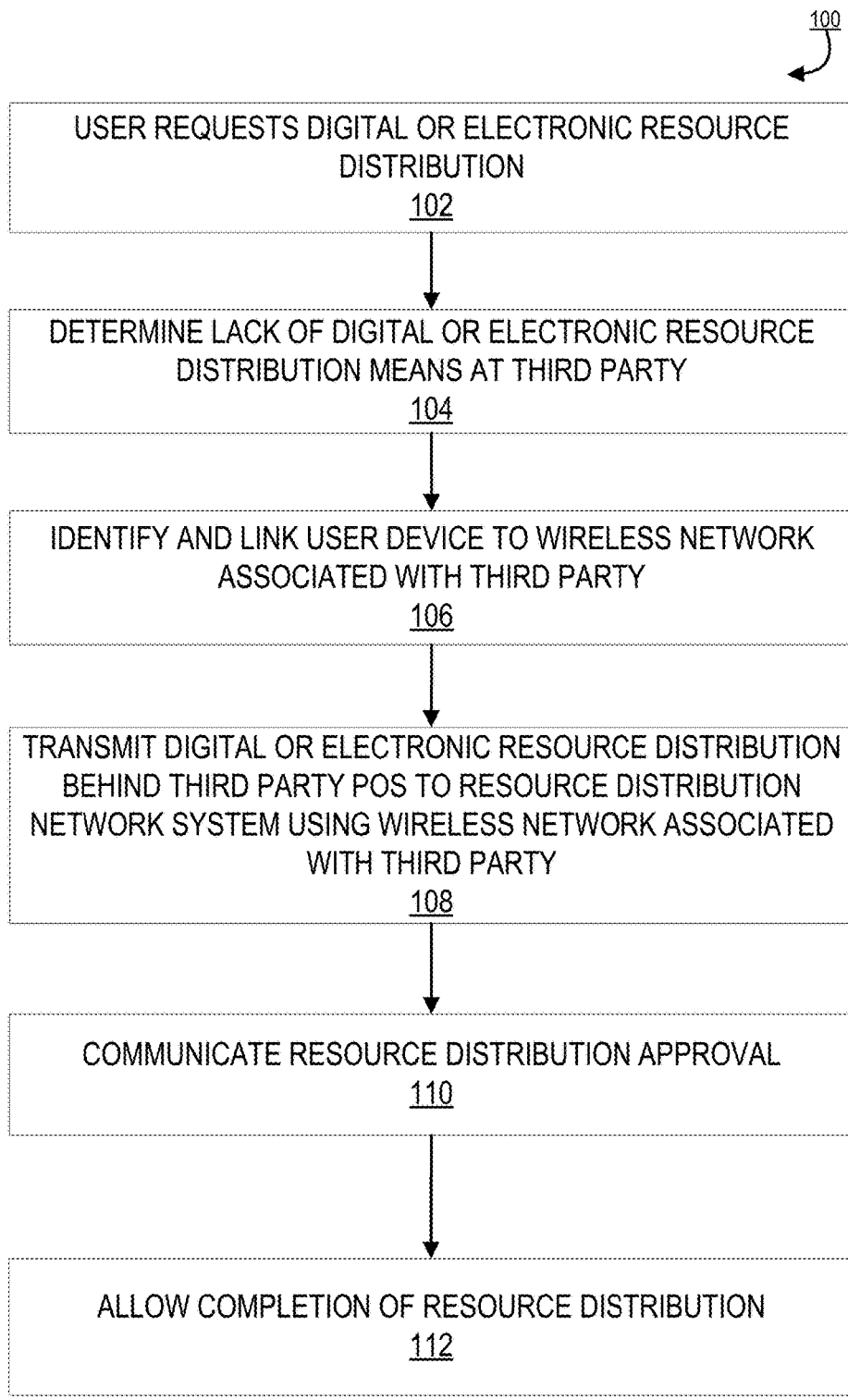
Figure 4:
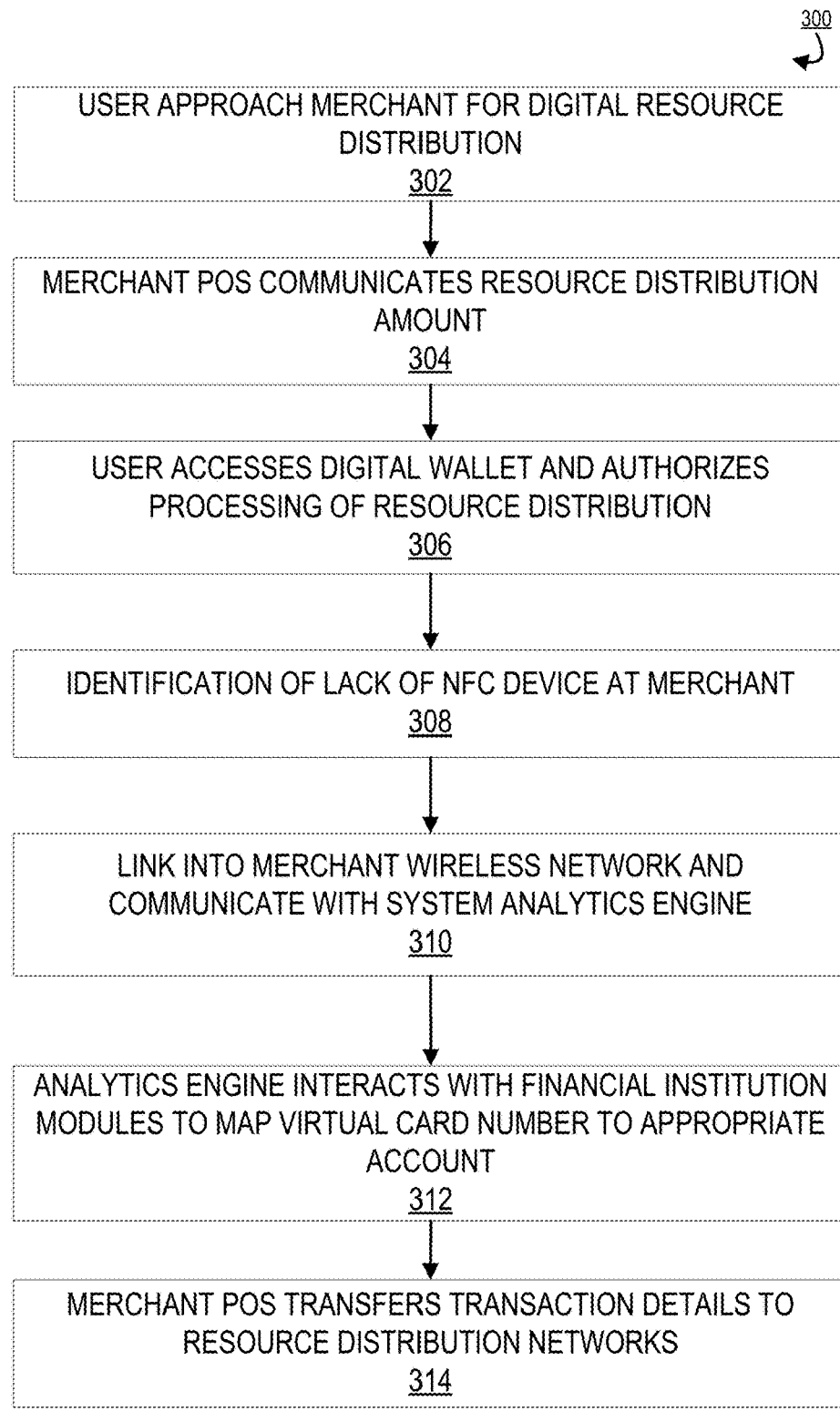
Figure 5:
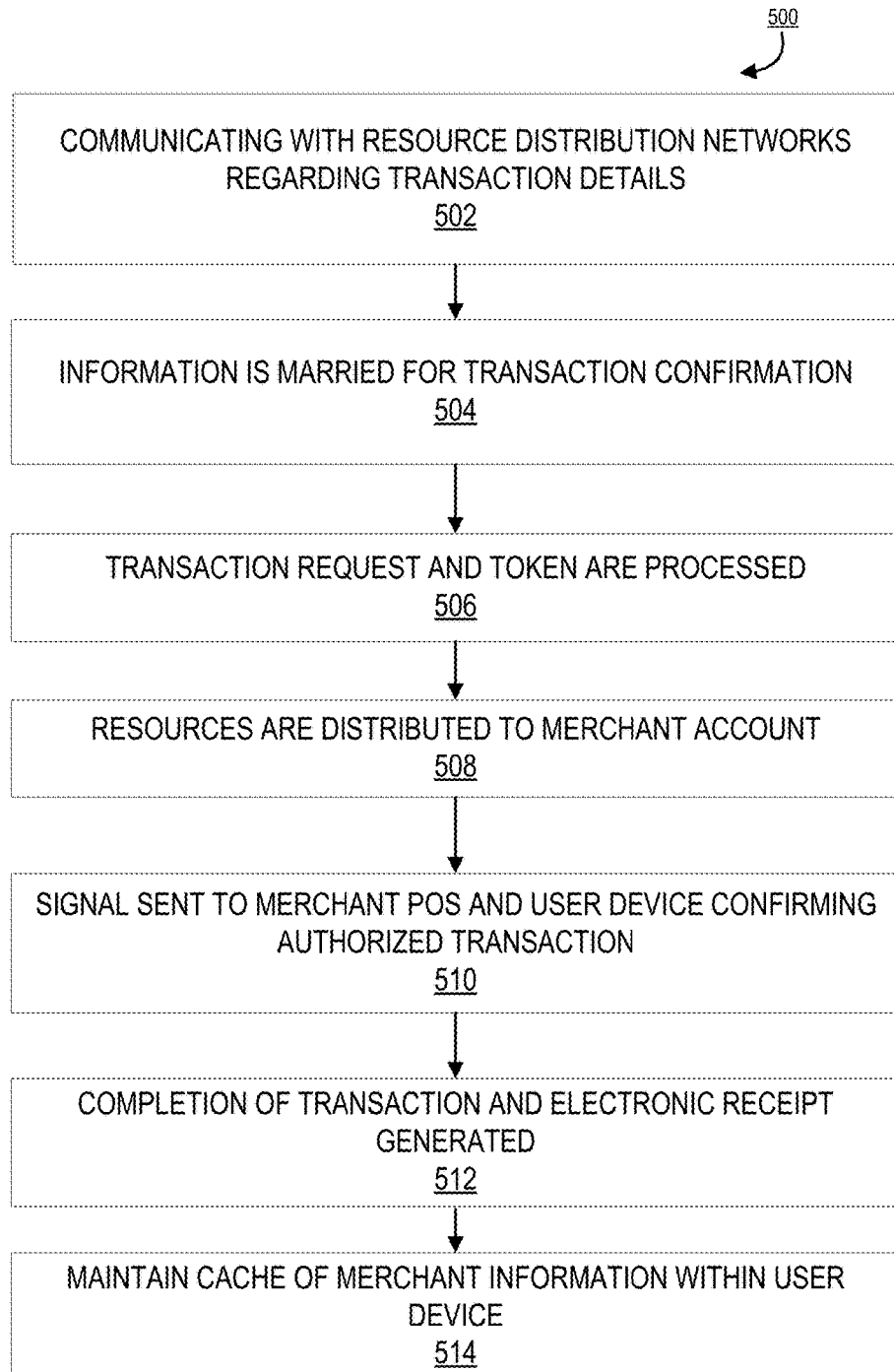
Figure 6:
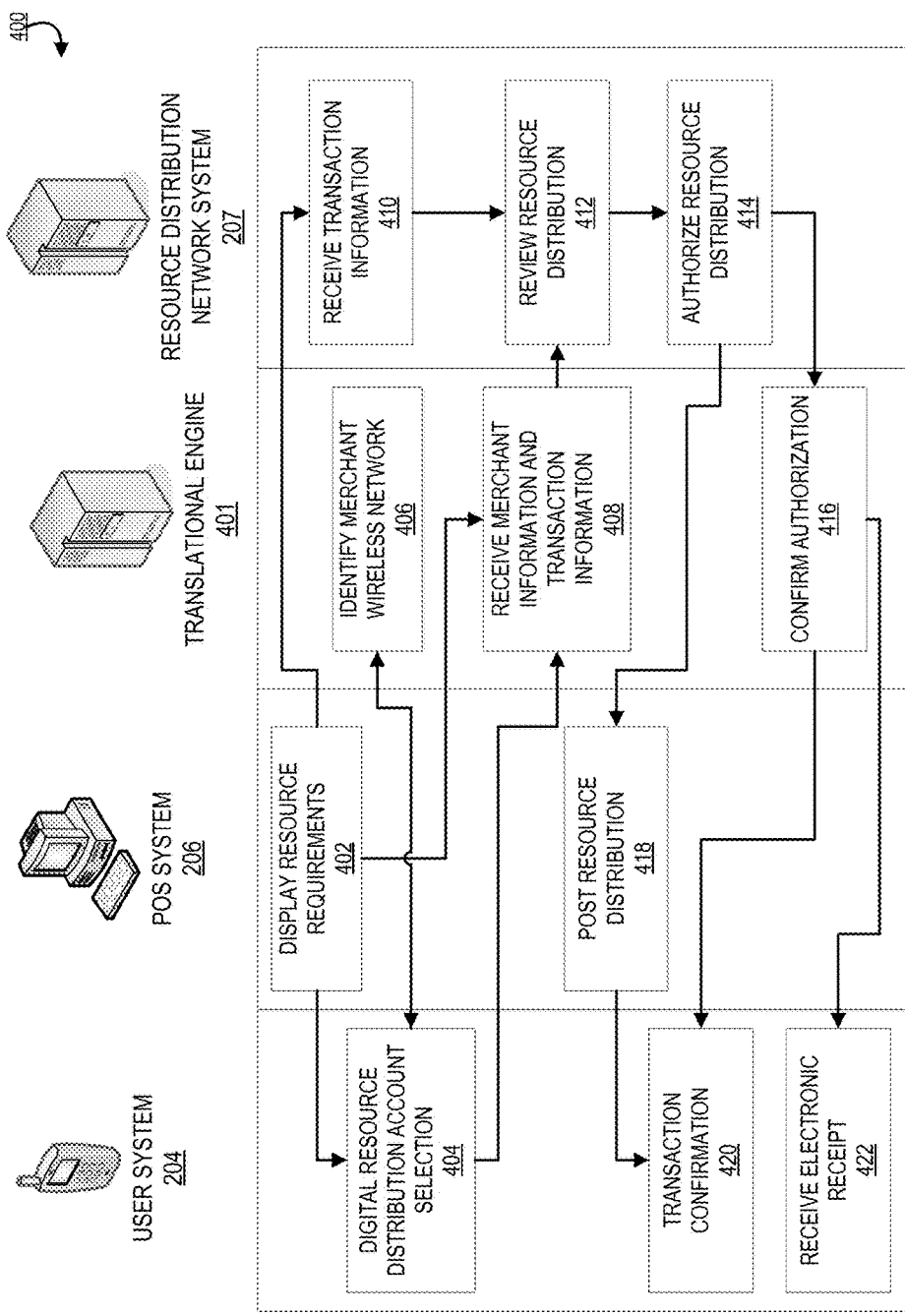

Having thus described embodiments of the invention in general terms, reference will now be made to the accompanying drawings, wherein:

FIG. 1 provides an atypical third party channel utilization system environment, in accordance with one embodiment of the present invention;

FIG. 2 provides an implemented NFC enabled merchant system transaction environment, in accordance with one embodiment of the present invention;

FIG. 3 provides a process map illustrating initiating an atypical third party channel resource distribution, in accordance with one embodiment of the present invention;

FIG. 4 provides a process map illustrating triggering of atypical third party channel resource distribution requirements, in accordance with one embodiment of the present invention;

FIG. 5 provides a detailed process flow illustrating utilization of the atypical third party channel resource distribution to complete a transaction, in accordance with one embodiment of the present invention; and FIG. 6 provides a process map illustrating system integration and communication for atypical third party channel resource distribution, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may are associated with total spend item level affinity identification.

Presenting a credit card on a digital wallet may provide a visual bank or credit card to the customer. As referred to herein, the visual bank or credit card may refer to, but is not limited to, an electronic or digital transaction vehicle that can be used to transfer money, make a payment (for a service or a good), withdraw money, and similar or related transactions. Using an approved/authorized banking channel of communication, which may include making a phone call, accessing online banking, walking into a branch banking center, using an automatic teller machine, or the like, a user may indicate that an existing physical transaction card associated with one or more financial accounts of the user is misplaced, lost, or has been misappropriated. Once the user is authenticated via the authorized banking channel, a request may be submitted for the instance issuance of a credit card. In response to the request the system may issue the credit card directly to a mobile device of the user. In that way, the user may easily display and use the virtual credit card prior to receiving the physical card for conducting a transaction.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

As used herein, an "account" is the relationship that a user has with an entity and resources stored therein. The account is associated with and/or maintained by the entity. In some embodiments, as used herein the term "activity" may refer to any game, product purchase, service purchase, movement to a location, As used herein, a "user" may be an entity customer or an individual that integrated or otherwise utilized the applications disclosed herein. A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including activity performance cross entity platform, and activity platform may refer to a platform that is used as a base upon which other applications, processing, or technologies are distributed including applications, activities, integration into currently used applications, integration into systems, presentation of user interfaces, and the like.

Further, the embodiments described herein may refer to use of a transaction or transaction event. Unless specifically limited by the context, a "transaction" refers to any communication between the user and an entity. In some embodiments, for example, a transaction may refer to a purchase of goods or services, a return of goods or services, a payment transaction, a credit transaction, or other interaction involving a user's bank account. As further examples, a transaction may occur when an entity associated with the user is alerted. A transaction may occur when a user accesses a building, uses a rewards card, and/or performs an account balance query. A transaction may occur as a user's device establishes a wireless connection, such as a Wi-Fi connection, with a point-of-sale terminal. In some embodiments, a transaction may include one or more of the following: purchasing, renting, selling, and/or leasing goods and/or services; withdrawing cash; making payments to creditors; sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile system. Such a device may be referred to herein as a "point-of-sale system" (POS system). A "point-of-sale" (POS) could refer to any location, virtual location or otherwise proximate occurrence of a transaction. A "point-of-sale system" may refer to any device used to perform a transaction, either from the user's perspective, the merchant's perspective or both. In some embodiments, the POS system refers only to a user's system, in other embodiments it refers only to a merchant system, and in yet other embodiments, it refers to both a user device and a merchant device interacting to perform a transaction. For example, in one embodiment, the point-of-sale system refers to the user's mobile device configured to communicate with a merchant's point of sale terminal, whereas in other embodiments, the POS system refers to the merchant's point of sale terminal configured to communicate with a user's mobile device, and in yet other embodiments, the POS system refers to both the user's mobile device and the merchant's point of sale terminal configured to communicate with each other to carry out a transaction.

In some embodiments, a POS system is or includes an interactive computer terminal that is configured to initiate, perform, complete, and/or facilitate one or more transactions. A POS system could be or include any device that a user may use to perform a transaction with an entity, such as, but not limited to, an ATM, a loyalty device such as a rewards card, loyalty card or other loyalty device, a magnetic-based payment device, a personal identification number (PIN) payment device, a contactless payment device, a radio frequency identification device (RFID) and the like, a computer, a mobile device, a merchant terminal, a self-service machine, a public and/or business kiosk, a gaming device, and/or various combinations of the foregoing.

In some embodiments, a POS system is operated in a public place. In other embodiments, the POS system, is additionally or alternatively operated in a place of business. In accordance with some embodiments, the POS system is not owned by the user of the POS system. Rather, in some embodiments, the POS system is owned by a mobile business operator or a POS operator. In yet other embodiments, the POS system is owned by the financial institution offering the POS system providing functionality in accordance with embodiments of the invention described herein.

The current market of digital or electronic resource distribution avenues, including digital wallets and the like typically require implementation of near field communication (NFC) or similar technology embedded within the merchant system and a user device as a means to propagate resource distribution via payment rails. When a resource distribution is displayed on a user facing terminal of a point-of-sale (POS) device at a merchant, the user utilizes a user device to select the desired vehicle for resource distribution and utilizes touch authentication via the NFC device.

Currently, NFC devices do not have large market acceptance. Market research suggests that larger merchants are utilizing these services and implementing this technology. However, for smaller scale merchants it is not easily ascertainable based on cost of replacing the existing POS with NFC capable POS or install a new NFC hardware that interacts with existing POS system at their store.

As such, embodiments of the present invention address the above needs and/or achieve other advantages by creating a system for atypical third party channel utilization for resource distribution completion. In this way, the system links local channels such as mobile internet or Wi-Fi to send resource distributions to a server with centralized NFC logic to map a virtual credit card to a physical credit card account. The account linking between merchant account and user account for resource transfer happens with parameter such as merchant store name, merchant store number, merchant store phone number, merchant zip code, user's phone number, or the like. The system, which includes mobile application logic comprising an translational engine will link all the required details to form a secure resource distribution order that is posted to merchant account via standard payment rails. The system, via mobile application integration may maintain a cache of merchant information based on location and frequency of user's visits. As such, the information will be used to present the ordered merchant list on mobile interface based on geo-location.

FIG. 1 illustrates provides an atypical third party channel utilization system environment 200, in accordance with one embodiment of the present invention. FIG. 1 provides the system environment 200 for which the distributive network system with specialized data feeds associated with the distributive network and specific triggering events associated with the data feeds for atypical third party channel utilization.

FIG. 1 provides a unique system that includes specialized servers and system communicably linked across a distributive network of nodes required for atypical third party channel utilization. The system, with its communicably linked diffusible network may, in some embodiments, improve a general computing device if utilized thereon by improving the ability for the computer device to access and securely present virtual credit cards on a digital wallet for transaction completion. Furthermore, in some embodiments, the system may be, as described below, run on a diffusion network of specialized nodes meant for authorizing and instant integration to a digital wallet.

As illustrated in FIG. 1, the financial institution server 208 is operatively coupled, via a network 201 to the user system 204, the resource distribution network system 207, and to the POS system 206. In this way, the financial institution server 208 can send information to and receive information from the user system 204, the resource distribution network system 207, and the POS system 206. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual consumer that is transacting or wishing to distribute resources to a merchant or other third party via digital or electronic means, such as via a mobile wallet. Furthermore, the user 202 is one or more individuals that may have an online banking presents and a digital wallet. The user 202 may make one or more transactions to purchase a product with a credit card via a digital wallet. In some embodiments, the purchase may be made by the user 202 using a user system 204.

FIG. 1 also illustrates a user system 204. The user system 204 generally comprises a communication device 212, a processing device 214, and a memory device 216. The user system 204 is a computing system that allows a user 202 to interact with the financial institution to apply for a credit card, access online banking applications, and utilize a digital wallet for transaction completion. The processing device 214 is operatively coupled to the communication device 212 and the memory device 216. The processing device 214 uses the communication device 212 to communicate with the network 201 and other devices on the network 201, such as, but not limited to the POS system 206, resource distribution network system 207, and the financial institution server 208. As such, the communication device 212 generally comprises a modem, server, or other device for communicating with other devices on the network 201. The user system 204 may also include a digital wallet or the like and may be referred to as a payment device or the like.

The user system 204 comprises computer-readable instructions 220 and data storage 218 stored in the memory device 216, which in one embodiment includes the computer-readable instructions 220 of a user application 222. In this way, a user 202 may open a financial institution account, apply for credit cards, remotely communicate with the financial institution, authorize and complete a transaction, or complete a transaction using the user system 204 via a digital wallet. Furthermore, the user application 222 may receive a token from the financial institution server 208, resource distribution network system 207, or POS system 206 and be stored on the memory device 216 of the user system 204. The user system 204 via the user application 222 may decrypt the token to access the credit card number, CVV number, expiration date, and/or other information required to complete a transaction via a virtual credit card on the digital wallet. The user system 204 may be, for example, a desktop personal computer, a mobile system, such as a cellular phone, smart phone, personal data assistant (PDA), payment system, laptop, watch, other wearable device, or the like.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POS system 206, resource distribution network system 207, and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for approval of a credit card application, present approval to online banking application, receive request for virtual credit card to be on digital wallet, provide virtual credit cards on a digital wallet, be associated with an issuing financial institution, or the like.

In some embodiments, the financial institution application 258 may allow for approval of a credit card application. In some embodiments, the financial institution application 258 may receive an application for a new credit card via the network 201 from the user 202 via the user system 204. The financial institution application 258 may approve the application after the application is submitted based on a stored standardized credit card application acceptance criteria stored in the memory 250. In some embodiments, this approval by the financial institution application 258 may be instantaneous upon receiving the application.

In some embodiments, the financial institution application 258 may present approval to an online banking application associated with the user 202. As such, once the financial institution application 258 has approved the user 202 for the new credit card, the financial institution application 258 may provide information about accessing and authorizing the use of the credit card via the user's digital wallet. The financial institution application 258 may provide this information via an online banking interface associated with the financial institution server 208 and the user's accounts at the financial institution. As such, the financial institution application 258 may provide the user 202 with the information via communication over the network 201 via data feeds to the user system 204. Once the user 202 is authenticated into an online banking platform, the financial institution application 258 may provide information about accessing and authorizing the use of the credit card via the user's digital wallet instantaneously.

In some embodiments, the financial institution application 258 may receive request for virtual credit card to be on digital wallet. As such, the financial institution application 258 may receive network data feeds or communications from the user 202 via a user system 204 over the network 201 requesting that the new credit card be implemented onto the user's digital wallet.

In some embodiments, the financial institution application 258 may determine the unique identity of the user system 204 and/or other devices associated with the digital wallet requesting the credit card and contact the devices for security confidence. In some embodiments, the financial institution application 258 may communicate with the user system 204 and/or other systems to identify the unique identifier. The financial institution application 258 may then initiate a security check on the devices. The security check generates a security confidence rating to confirm that the device requesting the new credit card to be implemented on the digital wallet and the device associated with the digital wallet are both devices associated with the user and are both not corrupted with viruses, malware, or the like. As such, the financial institution application 258 communicates and provides codes for download on the user system 204 that may be encrypted and subsequently decrypted by the user system 204 for system monitoring and malware searching. As such, the security check and subsequently generated security confidence rating ensures that misappropriation of the new credit card cannot occur. As such, the security check may, in some embodiments, provide code and/or access information about the requesting device and digital wallet device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the new credit card to the digital wallet.

As illustrated in FIG. 1, the POS system 206 generally comprises a reading device 235, a communication device 236, a processing device 238, and a memory device 240. The reading device 235 is operatively coupled to the processing device 238, communication device 236, and the memory device 240. The POS system 206 may include a reader device 235 to receive payment account information from the user 202 through the user device 204 and/or other payment devices. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the user's 202 payment account and/or transaction data at the POS system 206 and communicates the information via the communication device 236 over a network 201, to other systems such as, but not limited to the user device 204, resource distribution network system 207, or the financial institution servier 208. As such, the communication device 236 generally comprises a modem, server, or other device for communicating with other devices on the network 201.

As further illustrated in FIG. 1, the POS system 206 comprises computer-readable instructions 242 stored in the memory device 240, which in one embodiment includes the computer-readable instructions 242 of a merchant application 244. A POS system 206 may refer to any device used to perform a transaction, either from the user's perspective, the merchant's perspective or both. In some embodiments, the POS system 206 may refer to a merchant device, and in yet other embodiments, it refers to both a user device and a merchant device interacting to perform a transaction. For example, in one embodiment, the POS system 206 refers to the user's mobile device configured to communicate with a merchant's point of sale terminal, whereas in other embodiments, the POS system 206 refers to the merchant's point of sale terminal configured to communicate with a user's mobile device, and in yet other embodiments, the POS system 206 refers to both the user's mobile device and the merchant's point of sale terminal configured to communicate with each other to carry out a transaction.

In some embodiments, a POS system 206 is or includes an interactive computer terminal that is configured to initiate, perform, complete, and/or facilitate one or more transactions. The POS system 206 as discussed herein may include any point of transaction device, such at a cash register, POS terminal, ATM, smart phone, back end server of a merchant, or the like. As such, the POS system 206 may be able perform a sale, an account balance check, a reward transfer, and account money transfer, a user 202 opening up a bank application on his mobile device or computer, a user 202 using his/her digital wallet, and/or the like.

In the embodiment illustrated in FIG. 1, the merchant application 244 allows the POS system 206 to be able to communicate over the network 201, the information related to the transaction being made, such as the transaction type, cost of transaction, product type, merchant location, user 202 location, and the like. The merchant application 244 may also receive information over the network 201.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a current NFC enabled merchant system transaction environment 1, in accordance with some embodiments of the invention. In current digital resource distribution transactions, such as those with mobile wallet initiated transactions, the user may initiate a purchase at a merchant utilizing his/her mobile wallet. The user 202 may select the virtual card from his mobile wallet and touch authenticate the user device to an NFC enabled POS device. The NFC device maps the virtual card to the physical card of the user and sends the request to a network system for approval. The approval from the network system is then connected with an issuing financial institution on a secure channel. The resources get deposited into the merchant's account and the merchant receives payment confirmation on the POS terminal for completion of the transaction. In some embodiments, the user device or payment device 4 may communicate a token to the NFC enabled POS device. In this way, as illustrated in FIG. 2, the tokenization service 50 may be provided by a third-party institution, the user's financial institution, or another institution involved in a transaction payment process. As illustrated in FIG. 2, a user 202 may utilize a payment device 4 (or in other embodiments a payment instrument over the Internet) to enter into a transaction via a digital wallet or the like. FIG. 2 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like). As such, when using a payment device 4 the transaction may be made between the POS and the payment device 4 by scanning information from the payment device 4, using NFC between the POS and the payment device 4, using wireless communication between the POS and the payment device 4. When entering into an e-commerce transaction over the Internet, for example using the payment device 4 or another device without a POS, a payment instrument may be used to enter into the transaction. The payment instrument may be the same as the token or digital wallet associated with the payment device 4, except they are not associated with specific payment device. For example, the token or digital wallet may be associated with an application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 202 with the one or more payment devices 4 may utilize the token. Alternatively, the payment device 4 may have one or more digital wallets stored on the payment device 4 that allow the user 202 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 202 and merchants 10.

As illustrated in FIG. 2, a tokenization service 50 may be available for the user 202 to use during transactions. As such, before entering into a transaction, the user 202 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, or the like) associated with the token that may limit the transactions in which the user 202 may enter. The limits may be placed on the token by the user 202, or another entity (e.g., person, company, or the like) responsible for the transactions entered into by the user 202 using the account associated with the token. The generation of the token may occur at the time of the transaction or well in advance of the transaction, as a one-time use token or multi-use token.

After or during creation of the token the user 202 enters into a transaction with a merchant 10 using the payment device 4 (or payment instrument over the Internet). In some embodiments the user 202 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 202 is entering with the merchant 10.

The merchant 10 submits the token (as well as any user account information not substituted by a token) and the transaction information for authorization along the normal processing channels (also described as processing rails), which are normally used to process a transaction made by the user 202 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described is when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the transaction is allowed), then the acquiring financial institution 20 thereafter sends the user account number, the other user information, and the transaction information directly to the issuing financial institution 40, or otherwise indirectly through the card association networks 30. The financial institution determines if the user 202 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 202 is completed. After the transaction is completed the token may be deleted, erased, or the like if it is a single-use token, or stored for further use if it is a multi-use token.

The embodiment illustrated in FIG. 2 prevents the user account number and other user information from being presented to the merchant 10; however, the tokenization service 50, acquiring financial institution 20, the card association networks 30, and the issuing financial institution 40 all utilize the actual user account number and other user information to complete the transaction.

The current market of digital or electronic resource distribution avenues, including digital wallets and the like typically require implementation of NFC or similar technology embedded within the merchant system and a user device as a means to propagate resource distribution via payment rails. When a resource distribution is displayed on a user facing terminal of a POS device at a merchant, the user utilizes a user device to select the desired vehicle for resource distribution and utilizes touch authentication via the NFC device. Currently, NFC devices do not have large market acceptance. Market research suggests that larger merchants are utilizing these services and implementing this technology. However, for smaller scale merchants it is not easily ascertainable based on cost of replacing the existing POS with NFC capable POS or install a new NFC hardware that interacts with existing POS system at their store.

As such, embodiments of the present invention address the above needs and/or achieve other advantages by creating a system for atypical third party channel utilization for resource distribution completion. In this way, the system links local channels such as mobile internet or Wi-Fi to send resource distributions to a server with centralized NFC logic to map a virtual credit card to a physical credit card account. The account linking between merchant account and user account for resource transfer happens with parameter such as merchant store name, merchant store number, merchant store phone number, merchant zip code, user's phone number, or the like. The system, which includes mobile application logic comprising an translational engine will link all the required details to form a secure resource distribution order that is posted to merchant account via standard payment rails. The system, via mobile application integration may maintain a cache of merchant information based on location and frequency of user's visits. As such, the information will be used to present the ordered merchant list on mobile interface based on geo-location.

FIG. 3 illustrates a process map for initiating an atypical third party channel resource distribution 100, in accordance with one embodiment of the present invention. As illustrated in block 102, the process 100 is initiated by a user requesting to perform a resource distribution digitally or electronically. In this way, the user may approach a third party, such as a merchant, at the third party location and desire to perform a transaction with the third party. This transaction may be an exchange of resources, a purchase of products, a purchase of services, or the like. Furthermore, the user may desire to transact with the merchant via electronic or digital means. As such, the user may desire to complete a transaction using a digital or electronic wallet stored on a user device.

Once the request for a digital or electronic transaction has been made, the system may identify the lack of a digital or electronic resource distribution means available at the third party, as illustrated in block 104. In this way, the third party may not have a POS with appropriate software and/or hardware, such as NFC or the like, in order to perform and authorize a transaction using the user's digital wallet. In the current market of digital or electronic resource distribution avenues, including digital wallets and the like typically require implementation of NFC or similar technology embedded within the merchant system and a user device as a means to propagate resource distribution via payment rails. Currently, NFC devices do not have large market acceptance and for smaller scale merchants it is not easily ascertainable based on cost of replacing the existing POS with NFC capable POS or install a new NFC hardware that interacts with existing POS system at their store.

The determination of a lack of the POS system with electronic or digital resource distribution means at a merchant location triggers the system to identify and link the user device to a wireless network associated with the third party, as illustrated in block 106. In this way, the third party location may have Internet access, cable access, satellite access, or the like through wired or wireless means. The system may link to these signals for communication with outside parties. In some embodiments, the third party may have a wireless internet access point. In other embodiments, the user's device may be able to transmit via cellular data or generate a wireless hotspot location. These signals may be utilized by the system to generate a communication link with a network system in order to bypass the POS system associated with the third party to complete the resource distribution.

As illustrated in block 108, the process 100 continues by transmitting the digital or electronic resource distribution behind the third party POS to a resource distribution network system, such as a credit card network system, using the wireless network associated with the third party. In this way, the system may utilize applications on the user device to communicate the resource distribution, third party, amount, and the like to a resource distribution network via a system integrated application. Furthermore, the POS may be able to communicate with the resources distribution network via traditional POS communications. As such, the system may provide the resources distribution network with the account and payment details and the POS system may provide the transaction details. This information may be matched by the resources distribution network and an approval of the resource distribution may be distributed.

As illustrated in block 110, the process 100 continues by communicating the resource distribution approval to the user and the third party. The third party may receive approval from the resources distribution network which will allow the POS to complete the transaction in a traditional manner. The user may receive communication of the approval via the wireless network associated with the third party from the system.

As illustrated in block 112, the process 100 is completed by allowing the completion of the resource distribution by posting the distribution to the third party account and providing confirmation or receipt of the resource distribution to both the user and the third party.

FIG. 4 illustrates a process map of triggering of atypical third party channel resource distribution requirements 300, in accordance with one embodiment of the present invention. As illustrated in block 302, the process 300 is initiated when the user approaches a merchant requesting a digital resource distribution. In this way, the user is transacting with the merchant at a merchant place of business for a product or service provided by the merchant. The user desires to complete the transaction using his/her digital wallet with electronic or digital payment accounts associated with the wallet for resource distribution.

Once the merchant has identified the products and/or services the user is attempting to transact for, the merchant POS system may communicate the resource distribution amount required to complete the transaction, as illustrated in block 304.

Next, as illustrated in block 306, the process 300 continues by the user accessing a digital wallet and authorizing the processing of resource distribution using one or more of the accounts associated with the digital wallet. A digital wallet may comprise one or more accounts associated with a credit card of a user. A typical insertion of a credit card onto a digital wallet requires a user to receive a physical credit card. Subsequently, the user must input the sixteen digit credit card number, the CVV number, the expiration date, and other information associated with the credit card manually into the digital wallet. Next, once the user has inputted all of the required information, the user system may send a request to the credit card processing institute or credit network to import the physical credit card to the digital wallet. Next, once the credit card processing institution receives the "add card" request the institution sends the request to the issuing financial institution for approval. After sending the request over to the financial institution, the financial institution may then provide a decision bank to the resource distribution network or credit card processing institution as to whether the credit card is eligible for digital wallet placement. Finally, the network may create a token and provide the token to the user's digital wallet and to the financial institution to record the token with the credit card account. Then, the user may be able to utilize his/her credit card via a digital wallet.

Next, as illustrated in block 308, the process 300 continues by system identification of a lack of NFC device at the merchant. In this way, upon the user opening his/her digital wallet for completion of the transaction, the system may identify a lack of ability for the POS system to complete a transaction using a digital wallet based on a lack of NFC device or software at the POS that is capable of finishing a transaction with a user attempting to utilize a digital wallet for the transaction.

As illustrated in block 310, the process 300 continues by linking the user device onto the merchant wireless network and allow for the user device digital wallet application to communicate with the system and an translational engine associated therewith. The translational engine may be one or more applications associated with the system. The translational engine allows for communication between the system and the resource distribution network systems, such as the credit card systems, network systems, or the like. Furthermore, the translational engine may communicate with one or more digital wallet account issuing institutions for identifying virtual card number (DPAN) tokens and mapping those tokens to a physical card account.

Furthermore, the user device may communicate with the translational engine to present transaction parameters such as the merchant store name, merchant store number, merchant store phone number, merchant zip code, user phone number, user account information, transaction amount, and the like.

As illustrated in block 312, the process 300 continues by the translational engine interacts with financial institution modules to map virtual card numbers, such as DPAN to the appropriate account. In this way, each digital card within the user's digital wallet may include a token and virtual card number, such as a DPAN, that is typically transferred for transaction completion using a digital wallet. In this way, the translational engine may communicate with the financial institution issuing the account associated with the digital wallet. The translational engine may identify the physical account number associated with the digital wallet account selected. In this way, the system nay identify the physical account number for completion of the transaction outside the digital wallet virtual card number and token. As such, as illustrated in block 312, the translational engine maps the physical account number associated with the user selected digital wallet account for the transaction, thus identifying the physical account associated with the digital wallet token and virtual card number.

Next, as illustrated in block 314, the process 300 is completed upon the merchant POS transfers the transaction details to the resource distribution networks. The resource distribution networks include the credit card networks that may approve a transaction for a credit card transaction. The POS may transfer the transaction details to the resource distribution networks in a standard payment rail system such as would be performed by the POS system during a standard credit card transaction.

FIG. 5 illustrates a detailed process flow for utilization of the atypical third party channel resource distribution to complete a transaction 500, in accordance with one embodiment of the present invention. FIG. 5 is a continuation of FIG. 4 and continues the process of utilizing the system for atypical third party channel utilization for resource distribution completion. As illustrated in block 502, the process 500 is initiated by communicating with resource distribution networks regarding transaction details. In this way, the translational engine may communicate with the resource distribution networks information about the physical account associated with the user that the user desired to use for the transaction. Furthermore, the translational engine may provide user information, merchant information, transaction information, and the like to the resource distribution networks. Furthermore, the POS system for the merchant may provide the resource distribution networks with transaction information, merchant information, and the like. The transaction information may include an amount, products, and the like. The merchant information may include the merchant address, name, contact information, and the like.

Next, as illustrated in block 504, the process continues by marrying the information from the POS system and the translational engine to confirm the transaction. In this way, the information from one or more sources may be combined and associated with the transaction. As such, this allows for the transaction to be processed for approval. As illustrated in block 506, the transaction request and the token associated with the transaction may be processed by the resource distribution networks once the information from the merchant information from the POS has been received and the user digital wallet account has been decrypted and the physical account information has been received.

The resource distribution networks may then approve the transaction for completion. Upon approval, the resource distribution networks may communicate with the issuing financial institution associated with the account of the user to distribute resources to the merchant account from the user account associated with the digital wallet account the user selected, as illustrated in block 508.

Next, as illustrated in block 510, the process 500 continues by sending a communication signal to the merchant POS system and the user device confirming the authorized transaction. In some embodiments, the resource distribution networks may communicate directly with the POS system. In some embodiments, the translational engine may communicate with the user device to confirm the transaction. As illustrated in block 512, the transaction is completed between the user and the merchant and an electronic receipt is generated and provided to the user via the user device.

Finally, as illustrated in block 514, the process 500 is completed by the system maintaining a cache of merchant information within the user device. As such, the system may identify the merchant by location and user history and store that merchant information for subsequent transactions for resource distribution. As such, the system may identify the geo-location of the user being at the merchant. Using this information, the system may be able to pull the cached information about the merchant and provide it to the analytic engine for faster transaction approval via the atypical third party channel.

FIG. 6 illustrates a process map for system integration and communication for atypical third party channel resource distribution 400, in accordance with one embodiment of the present invention. FIG. 6, as illustrated, shows the process of data communication across systems on the network. In this embodiment, the systems include the user system 204, the POS system 206 associated with the merchant, an translational engine 401 associated with the system, and the resource distribution network system 207.

The process 400 is initiated when the POS system 206 indicates a total resource amount required for the transaction. In this way, as illustrated in block 402, the POS system 206 displays the resource requirements to complete the transaction. At that point, as illustrated in block 410, the POS system 206 also communicates the transaction information, such as information about the merchant, the resource amount required, and the like to the resource distribution network system 207 as if the transaction was being completed via standard credit card payment rails. The user then selects via the user system 204 the digital resource distribution account he/she desires for to user as resources for the transaction, as illustrated in block 404.

At that point, the system is triggered because the system identifies that the POS system 206 is not capable of completing a transaction with a digital resource distribution account, such as a digital wallet. In this way, the POS system 206 may not comprise an NFC device or the like. As such, upon triggering, the translational engine 401 in conjunction with the user system 204 identifies a merchant wireless network 406 and links the user system 204 into the network for communication with the other systems on the network.

Next, as illustrated in block 408, the translational engine receives information about the transaction. In some embodiments, the information may come from the user system 204. In some embodiments, the information may come from the POS system 206. In other embodiments, the information may come from both the POS system 206 and the user system 204. The information may include information about the transaction, such as the amount, user account, or the like. The information may also include information about the merchant and/or the user.

The translational engine 401 may convert the digital wallet account information from the user into a physical account that may be read by the resource distribution network system 207. The resource distribution network system 207 may review the resource distribution as illustrated in block 412. The resource distribution network system 207 may receive transaction information from the POS system 206 directly and from the translational engine 401. The translational engine 401 may convert the digital wallet account and token information into data readable by the resource distribution network system 207. As illustrated in block 414, the resource distribution network system 207 may approve the transaction and resource distribution. The resource distribution network system 207 may post the resource distribution and payment to the merchant account 418 and notify the POS system 206 of the posting. Furthermore, the translational engine 401 may confirm the authorization and posting, as illustrated in block 416 and provide additional conformation to the user via the user system 204 as illustrated in block 420. The translational engine 401 may also transmit an electronic receipt to the user via the user system 204 as illustrated in block 422.

The current market of digital or electronic resource distribution avenues, including digital wallets and the like typically require implementation of near field communication (NFC) or similar technology embedded within the merchant system and a user device as a means to propagate resource distribution via payment rails. When a resource distribution is displayed on a user facing terminal of a point-of-sale (POS) device at a merchant, the user utilizes a user device to select the desired vehicle for resource distribution and utilizes touch authentication via the NFC device.

Currently, NFC devices do not have large market acceptance. Market research suggests that larger merchants are utilizing these services and implementing this technology. However, for smaller scale merchants it is not easily ascertainable based on cost of replacing the existing POS with NFC capable POS or install a new NFC hardware that interacts with existing POS system at their store.

As such, embodiments of the present invention address the above needs and/or achieve other advantages by creating a system for atypical third party channel utilization for resource distribution completion. In this way, the system links local channels such as mobile internet or Wi-Fi to send resource distributions to a server with centralized NFC logic to map a virtual credit card to a physical credit card account. The account linking between merchant account and user account for resource transfer happens with parameter such as merchant store name, merchant store number, merchant store phone number, merchant zip code, user's phone number, or the like. The system, which includes mobile application logic comprising an translational engine will link all the required details to form a secure resource distribution order that is posted to merchant account via standard payment rails. The system, via mobile application integration may maintain a cache of merchant information based on location and frequency of user's visits. As such, the information will be used to present the ordered merchant list on mobile interface based on geo-location.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for atypical third party channel utilization for resource distribution, the system comprising:
a memory device with non-transitory computer-readable program code stored thereon;
a communication device;
a processing device operatively coupled to the memory device and the communication device within a distributive network for authorization and instant integration approval for a digital resource distribution, wherein the processing device is configured to execute the computer-readable program code to:
  identify a user requesting the digital resource distribution to a merchant, wherein identifying the request comprises integrating within a user device associated with the digital resource distribution request and wherein the digital resource distribution further comprises a digital wallet, wherein a digital resource distribution token includes a virtual credit card token that is stored in a user device memory for digital resource distribution to the merchant;
  determine software and hardware incapability within merchant system to complete the digital resource distribution, wherein the merchant system is a POS device and the merchant system does not have NFC or digital wallet transaction software and hardware;
  identify, in response to determining software and hardware incapability, merchant wireless channel and link communicably to the wireless channel; wherein the merchant wireless channel further comprises a wireless network associated with a merchant place of business;
  request and receive resource distribution information from the user device, wherein the resource distribution information includes a digital resource distribution token required for the digital resource distribution to the merchant;
  translate the digital resource distribution token into a physical resource distribution account number;
  distribute the translated digital resource distribution token to a resource distribution network system for processing and authorization;
  match, within the resource distribution network, the distributed translated digital resource distribution token with resource distribution processing transmitted from the merchant system to the resource distribution network; and
  transmit resource distribution network resource distribution approval to user device.

2. The system of claim 1, further comprising communicating to the merchant system to allow the merchant system to distribute the resource distribution processing about the digital resource distribution to the resource distribution network without receiving a credit card from the user.

3. The system of claim 1, further comprising allowing the resource distribution network to transmit an approval of the resource distribution to the merchant system based on an approval of the resource distribution by the resource distribution network.

4. The system of claim 1, wherein resource distribution information further comprises transaction information to complete a transaction with a merchant including user name, user digital resource distribution account, merchant name, merchant contact information, product/service information, and a resource distribution requirement to complete a transaction.

5. The system of claim 1, wherein the resource distribution processing further comprises a transaction total for the resource distribution.

6. A computer program product for atypical third party channel utilization for resource distribution, the computer program product, within a distributive network for authorization and instant integration approval for a digital resource distribution, comprising at least one non-transitory computer-readable medium having computer-readable program code portions embodied therein, the computer-readable program code portions comprising:
   an executable portion configured for identifying a user requesting the digital resource distribution to a merchant, wherein identifying the request comprises integrating within a user device associated with the digital resource distribution request and wherein the digital resource distribution further comprises a digital wallet, wherein a digital resource distribution token includes a virtual credit card token that is stored in a user device memory for digital resource distribution to the merchant;
   an executable portion configured for determining software and hardware incapability within merchant system to complete the digital resource distribution, wherein the merchant system is a POS device and the merchant system does not have NFC or digital wallet transaction software and hardware;
   an executable portion configured for identifying, in response to determining software and hardware incapability, merchant wireless channel and link communicably to the wireless channel wherein the merchant wireless channel further comprises a wireless network associated with a merchant place of business;
   an executable portion configured for requesting and receiving resource distribution information from the user device, wherein the resource distribution information includes a digital resource distribution token required for the digital resource distribution to the merchant;
   an executable portion configured for translating the digital resource distribution token into a physical resource distribution account number;
   an executable portion configured for distributing the translated digital resource distribution token to a resource distribution network system for processing and authorization;
   an executable portion configured for matching, within the resource distribution network, the distributed translated digital resource distribution token with resource distribution processing transmitted from the merchant system to the resource distribution network; and
   an executable portion configured for transmitting resource distribution network resource distribution approval to user device.

7. The computer program product of claim 6, further comprising an executable portion configured for communicating to the merchant system to allow the merchant system to distribute the resource distribution processing about the digital resource distribution to the resource distribution network without receiving a credit card from the user.

8. The computer program product of claim 6, further comprising an executable portion configured for allowing the resource distribution network to transmit an approval of the resource distribution to the merchant system based on an approval of the resource distribution by the resource distribution network.

9. The computer program product of claim 6, wherein resource distribution information further comprises transaction information to complete a transaction with a merchant including user name, user digital resource distribution account, merchant name, merchant contact information, product/service information, and a resource distribution requirement to complete a transaction.

10. The computer program product of claim 6, wherein the resource distribution processing further comprises a transaction total for the resource distribution.

11. A computer-implemented method for atypical third party channel utilization for resource distribution, the method comprising:
   providing a computing system within a distributive network for the authorization and instant integration approval for a digital resource distribution, comprising a computer processing device and a non-transitory computer readable medium, where the computer readable medium comprises configured computer program instruction code, such that when said instruction code is operated by said computer processing device, said computer processing device performs the following operations:
      identifying a user requesting the digital resource distribution to a merchant, wherein identifying the request comprises integrating within a user device associated with the digital resource distribution request and wherein the digital resource distribution further comprises a digital wallet, wherein a digital resource distribution token includes a virtual credit card token that is stored in a user device memory for digital resource distribution to the merchant;
      determining software and hardware incapability within merchant system to complete the digital resource distribution, wherein the merchant system is a POS device and the merchant system does not have NFC or digital wallet transaction software and hardware;
      identifying, in response to determining software and hardware incapability, merchant wireless channel and link communicably to the wireless channel, wherein the merchant wireless channel further comprises a wireless network associated with a merchant place of business;
      requesting and receive resource distribution information from the user device, wherein the resource distribution information includes a digital resource distribution token required for the digital resource distribution to the merchant;
      translating the digital resource distribution token into a physical resource distribution account number;
      distributing the translated digital resource distribution token to a resource distribution network system for processing and authorization;
      matching, within the resource distribution network, the distributed translated digital resource distribution token with resource distribution processing transmitted from the merchant system to the resource distribution network; and
      transmitting resource distribution network resource distribution approval to user device.

12. The computer-implemented method of claim 11, further comprising communicating to the merchant system to allow the merchant system to distribute the resource distribution processing about the digital resource distribution to the resource distribution network without receiving a credit card from the user.

13. The computer-implemented method of claim 11, further comprising allowing the resource distribution network to transmit an approval of the resource distribution to the merchant system based on an approval of the resource distribution by the resource distribution network.

\* \* \* \* \*